Figure 1:
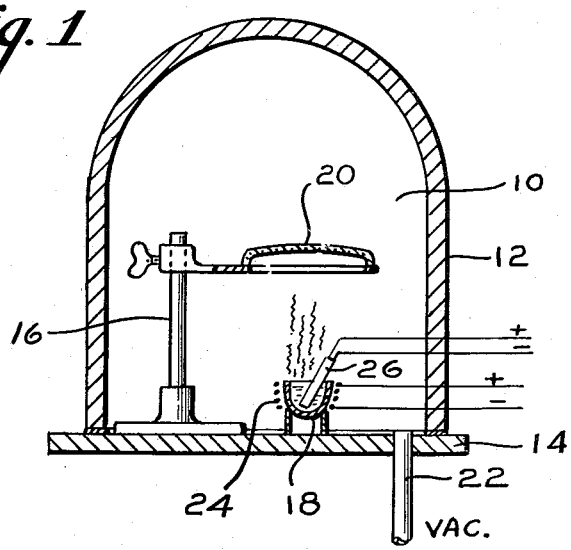

March 6, 1962 R. H. DALTON ET AL 3,024,381
LIGHT FILTER AND METHOD OF PRODUCTION
Filed Sept. 4, 1957 2 Sheets-Sheet 1

INVENTORS
ROBERT H. DALTON
AND PETER GREGO
BY Clarence R. Patty, Jr.
ATTORNEY

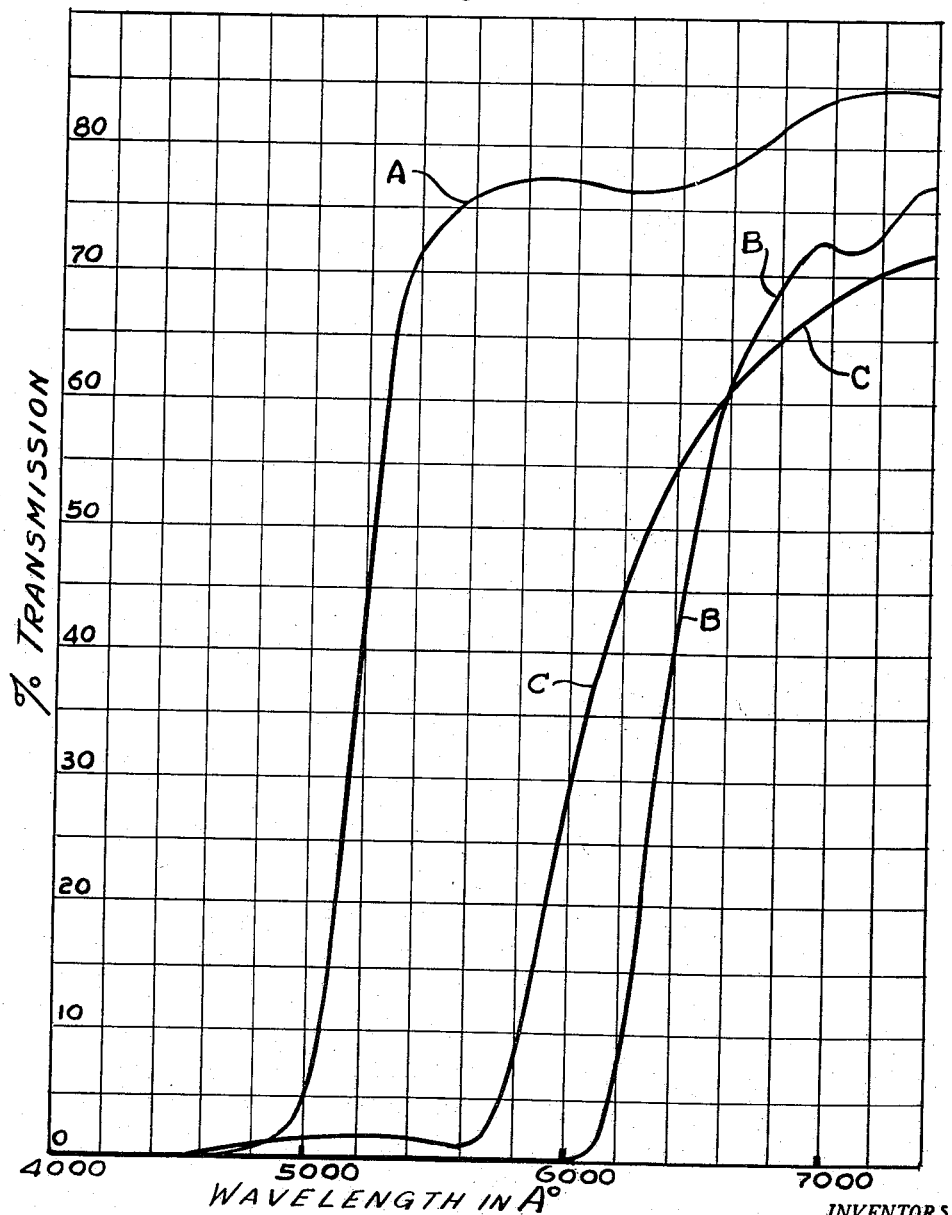

United States Patent Office 3,024,381
Patented Mar. 6, 1962

3,024,381
LIGHT FILTER AND METHOD OF PRODUCTION
Robert H. Dalton and Peter Grego, Corning, N.Y., assignors to Corning Glass Works, Corning, N. Y., a corporation of New York
Filed Sept. 4, 1957, Ser. No. 681,944
10 Claims. (Cl. 313—112)

This invention relates to light filters capable of providing colored lighting effects and production of such filters. It is particularly concerned with filters capable of selectively transmitting light in the upper or yellow to red portion of the visible light spectrum and with electric lamps embodying such filters.

Selective visible light transmission, more commonly known and referred to as colored lighting, has found wide use in display and stage lighting. It is presently finding increased application in these, as well as other, lighting fields. While suitably colored light filters may be employed with conventional incandescent lamps for such purposes, it is generally more desirable to employ an incandescent lamp in which the lamp envelope itself, or at least the face portion of the envelope, is provided with a suitable colorant.

Heretofore, it has been the practice to produce the lamp envelope from a colored glass, that is a glass having a suitable colorant incorporated in the batch from which it is melted. For various reasons, this practice is incapable of satisfactorily meeting present needs. Glass envelopes produced by the melting of colored glass have always been relatively expensive and the increased use of colored lighting has accentuated the desire for a lower cost lamp. Also, development of higher power lamps, involving greater evolution of heat and hence higher operating temperatures, has created a need for low expansion, heat resistant glass lamp envelopes.

Suitable colors have been readily obtainable in base glasses having a relatively high expansion, such as the familiar lime glasses used in incandescent lamp manufacture. Duplication of such colors in low expansion glasses, such as the familiar borosilicate glasses, has presented serious difficulty however. Lower expansion glasses almost invariably require considerably higher melting temperatures with the result that colorants such as metallic sulfides and selenides tend to volatilize to a considerable extent during melting. This not only represents an economic loss but leads to a lack of color control in the glass envelopes or other products produced from such glass. This condition has proven particularly serious in the case of so-called red and yellow glasses where selenides and sulfides are the principal coloring materials available for use.

It is also well known that low expansion glasses generally, and borosilicate glasses in particular, are more difficult to melt. Hence cord streaks and other imperfections or inhomogeneities frequently appear in products produced from such glasses. These inhomogeneities are seriously accentuated by the presence of a colorant in the glass and produce an unsightly appearing lamp. Thus the need for an alternative means of providing selective light transmission is presented.

It is well known to produce red and yellow coloration in glass by staining methods wherein copper or silver salts are applied to the glass surface and the metal ions caused to replace alkali ions in the glass. However, the colors obtained by such procedure do not have the desired degree of purity previously available in the best colored glasses melted for lighting purposes. In other words the red and yellow colors produced by staining tend to have a brownish cast rather than a pure color, that is one with a sharp transmission cutoff. Furthermore cord streaks and other imperfections in the glass are generally accentuated by stain colors to a greater degree than in glasses having the colorant melted in the glass.

There are a variety of organic and ceramic suspension coatings, which may be applied to and fired on a glass surface to produce a colored coating, but such coatings are relatively expensive to produce. Furthermore the organic materials tend to introduce contaminants into the lamp when used on a bulb interior. On the exterior surface the coatings tend to abrade in handling and become unsightly. Also, for many lamp applications they are not sufficiently heat stable. On the other hand the ceramic coatings are too high in expansion for a good match with heat resistant glasses and there is a tendency for these coatings to craze when so used. It is also difficult to obtain pure colors of sufficient intensity.

It has been proposed to mechanically adhere powdered pigments to the etched surface of a glass bulb or other article. It is difficult to obtain adequate adherence and uniformity of coating by such procedure and the resulting diffused coloring is generally unsatisfactory. As a result this process has not been commercially attractive.

A primary purpose of the present invention then is to provide light filters and glass components for lighting ware which have the desired pure colors, that is colors with a sharp transmission cutoff. A further purpose is to provide such selective light transmitting articles in which the color is uniform and independent of the quality of the glass base. A further purpose is to provide an economic efficient means of providing these desired colors on a clear, uncolored glass base. A further purpose is to provide a thermal evaporation type of process which will produce the desired color effect on such a glass base.

To these and other ends our invention is embodied in a light transmitting element comprising a transparent uncolored glass base and a thin continuous film condensed on one surface of the glass, the film being composed of a material selected from CdS, CdSe and mixtures thereof and having a sharp transmission cutoff for visible light which occurs within the wave length range of 5000–7000 Angstrom units. It is further embodied in a method of producing such an element which comprises condensing vapors of a substantially pure material selected from the named class onto the glass base to form a film of uniform thickness.

Figure 2:
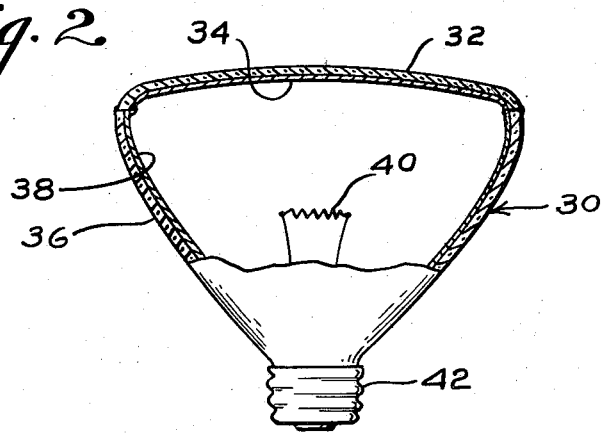

The invention will be better understood from the following description taken in conjunction with the accompanying drawing wherein FIG. 1 is a view in section of an apparatus suitable for producing articles in accordance with the invention, FIG. 2 is a side elevation view, partly broken away, of a lamp embodying the invention, and, FIG. 3 is a graphic illustration of a characteristic feature of articles produced in accordance with the invention.

FIG. 1 illustrates a conventional thermal evaporation apparatus including a vacuum chamber 10 formed by a bell jar 12 in conjunction with a base plate 14, an article support 16 and an evaporating crucible 18. In operation, a clear glass body 20, here shown as a lens suitable for sealing to a corresponding reflector to form a lamp envelope, is mounted on support 16 which may suitably be a ring type support, and chamber 10 is evacuated through vacuum line 22 by conventional pumping means not shown. When a suitably low pressure is obtained in chamber 10, crucible 18 containing a suitable coating material is electrically heated by current passing through coils 24 with the temperature of the coating material being measured by a thermocouple 26.

The material thermally evaporated from crucible 18 is condensed on the exposed surface of glass article 20 to form a homogeneous film of uniform thickness and uniform light transmitting characteristics on the glass surface. Except as subsequently indicated the method of application may be substantially the same for all materials. The material employed will then depend on the particular color desired and is selected from a group consisting of cadmium sulfide, cadmium selenide, and mixtures of these two materials. Cadmium sulfide alone produces a yellow colored film having a transmission cutoff at about 5000 Angstrom units. Where a deep red colored film, that is a film having a transmission cutoff at about 6500–7000 Angstroms is desired, cadmium selenide, or material commercially available under that designation, is employed. For light red, orange and amber colors, having transmission cutoffs intermediate these extremes, suitable mixtures of the two materials, also known as cadmium sulphoselenides, are employed.

We have found that a primary requisite for production of pure, or sharp cutoff, transmission films by the method described is a high degree of purity in the film material. To this end care should be taken in selecting materials of high purity and the evaporation equipment should be such that no oxides or other materials are evaporated therefrom during the coating process. In this connection we prefer to use a quartz or high silica content glass crucible and to employ stable refractory metal heating elements such as platinum. Alternatively, tungsten or molybdenum heating elements may be employed but care must be taken not to expose such elements to air unless completely cooled, thus avoiding formation of oxides which may subsequently volatilize and destroy film transmission characteristics.

Prior to evaporating the film materials it is necessary to reduce the pressure in the vacuum chamber below about 1 micron in order to effectively produce the desired colored films. With higher pressures it appears that the coating materials become slightly oxidized or otherwise affected by the gases present, thereby producing a film in which the transmission does not cutoff as sharply as desired, in other words an impure or off-color film.

In evaporating the materials for condensation on the glass base the crucible temperature may be raised at any desired rate to a temperature slightly below the melting point, that is about 700° C. At that point, the coating material may be baked out for a short time to insure removal of any free sulfur or metal, organic material, or other impurity which might affect the color characteristics of the film. Where a single charge of coating material is used to successively coat several lenses, it is unnecessary to repeat this bakeout step for each lens. After such bakeout the temperature is slowly raised to a temperature of about 800° C. so that the material in powder form does not bubble or spatter from the crucible as it melts. Temperatures above 800° C. are undesirable for at least two reasons. At such higher temperatures the material tends to evaporate too rapidly and, of even greater significance when cadmium selenide is present, decomposition to produce metallic selenium tends to occur. This in turn condenses on the glass base and produces a metallic film which destroys the color characteristics of the film.

It has heretofore been proposed to employ condensed metallic sulfide films, that have been suitably activated, as phosphor screens in cathode ray tubes and the like. There is no evidence that such films exhibit desirable color characteristics and we have found that activating processes, and the presence of activating materials such as free metals, are generally incompatible with, and adverse to, the color effects presently desired. For present purposes then the presence of foreign materials such as phosphor activators should be carefully avoided.

In general the present film thickness should be on the order of ½ to 1 micron and the rate and time of evaporation should be controlled in known manner to produce such thickness. Thinner films tend to be too pale or light in color whereas thicker films are unduly dark for most purposes and tend to crack or peel from the glass surface, probably due to expansion differences.

In order to obtain a film of substantially uniform thickness on the glass surface being coated it is necessary to uniformly expose the surface to the coating vapors. In the case of curved articles such as the lamp lenses shown in FIGS. 1 and 2 this may be accomplished by positioning the crucible of material at a distance from the glass surface which is about equal to the radius of curvature of the glass. Where such an arrangement is impractical or where, for example, a relatively large flat glass surface is being coated, it may be necessary to alter the physical characteristics of the evaporation crucible or use a plurality of crucibles so that a relatively uniform amount of vapor is directed to all parts of the glass surface. Such variations to meet individual circumstances will be readily made by one familiar with the art of thermal evaporation. It is also contemplated that coil evaporation and other well-known thermal evaporation techniques may be employed in accordance with principles of operation set forth here, where such techniques are desirable.

It will readily be apparent that the film should be as free as possible of pin holes or discontinuities. While formed glass surfaces are theoretically free of contamination, it is frequently impossible and seldom practical to maintain the glass in such condition. Accordingly it is necessary to thoroughly cleanse the glass surface prior to coating it. For this purpose we have found that washing the glass in dilute nitric acid solution followed by washing with distilled water and drying is a most effective means of providing a clean glass surface for film formation.

We have further found that under certain circumstances the film is not as adherent to the glass base as might be desired. While the reasons for this are not readily apparent, we have found that this condition may be avoided by applying the film in two steps or stages. Thus a very thin film is initially produced on the glass surface and the filmed glass removed and baked in an oven at a temperature of about 500° C. for about 10 minutes. Following this baking operation the glass is then further exposed to film forming vapors to produce the desired film thickness. This intermediate baking step has been found to greatly improve film adherence.

It should also be noted that, where a cadmium sulfide film is being formed, there is a tendency for the material to decompose slightly with formation of a slight cadmium coloration in the film. This can be avoided by maintaining the glass lens or other article surface at about 350° C. during coating. To this end a heating coil can be installed in the coating chamber adjacent the glass article in known manner. Alternatively, the off-color due to free cadmium can be corrected by heating the coated article to 350° C. to 500° C. after coating. This presumably oxidizes or volatilizes the cadmium so that it has no appreciable effect on the yellow coloration of the cadmium sulfide.

FIG. 2 illustrates a typical application of the present invention in an incandescent lamp. As schematically shown the lamp, generally designated 30, is composed of a lens member 32 having on its interior surface a film 34 prepared in the manner described above. Lens 32 is sealed in any suitable manner to a reflector member 36 having a reflecting coating 38 on its interior surface and a filament 40 mounted in a conventional base 42. It will of course be appreciated that the entire lamp envelope might be formed as a single unit with its face portion filmed in accordance with the present invention or, alternatively, a separate filmed light filter might be cemented to or attached over the face of a conventional bulb. Such variations in mechanical constructions are readily apparent to skilled lamp makers.

The salient features of filmed glass articles produced in accordance with this invention are independence of substrate compositions, clarity of color and sharp transmission cutoff. The term "sharp transmission cutoff" and corresponding terminology, as here used, has the conventional commercial meaning that the visible light transmission of the article involved changes sharply from a relatively high percentage on the order of 60–80% to a low, relatively insignificant value of 1% or less within a narrow range or band of the spectrum of the order of about 500 Angstrom units in width. This sharp change is definitive of so-called pure color in an article. In terms of spectrophotometric curves commonly used to illustrate the color characteristics of an article, this means that such a curve will have two relatively flat or lateral sections, one in the neighborhood of 60–80% transmission and the other at substantially zero transmission, with an almost vertical intermediate section which covers only a narrow wave length band on the order of 500 Angstrom units wide.

This characteristic is graphically illustrated in FIG. 3 by transmission curves A, B, and C of, respectively, a yellow lens prepared in accordance with the invention, a red lens prepared in accordance with the invention, and a red lens prepared by a conventional copper staining process. These curves are plotted from transmission data obtained on a recording spectrophotometer. Curve A shows a transmission of 1% at 4900 Angstroms and a transmission of 70% at 5400 Angstroms and is indicative of a pure or clear yellow color in the lens. Curve B shows a transmission of 1% at 6100 Angstroms and 61% at 6600 Angstroms and is indicative of a pure or clear, medium red color. Curve C shows a transmission of 1% at 4900 Angstroms and 61% at 6600 Angstroms and illustrates a medium red color having a brownish or amber cast. Curves A and B typify the pure or sharp cutoff coloration provided by films produced in accordance with this invention while curve C, by way of comparison, is typical of an impure or mixed red color.

The upper portion of the curves A and B, indicating the area of maximum transmission, is neither as smooth nor as high as is normally found in glasses having the colorant incorporated by melting. This appears to be due to the structure of the film or reflectance factors although the full explanation is not conclusively established. In any event it is of relatively little significance as far as the purity of color of the transmitted light is concerned, the critical criterion in this respect being the sharpness of rise in the intermediate portion of the curves and the shape and height of the foot.

The invention is further illustrated by the following detailed specific examples which describe the production of glass articles corresponding to those from which curves A and B were obtained.

*Example 1*

A thermal evaporation apparatus similar to that illustrated in FIG. 1 was employed. A glass lens, of the type known in the lamp industry as a PAR 38 lens, was mounted on a ring support with its interior surface exposed downwardly. The lens was 4¾ inches in diameter, had a radius of curvature of about 3½ inches and was pressed from a clear borosilicate lamp glass. Prior to mounting, the lens was washed, dipped in 10% $HNO_3$, rinsed in distilled water and dried.

A 96% silica glass crucible, having a molybdenum wire heating coil cemented on its exterior wall was mounted about 3½ inches below the lens with about 5 grams of pure cadmium sulfide, this being an amount of material adequate to coat several such lenses.

The vacuum chamber was evacuated to a pressure below one micron. The crucible was then heated to 700° C. and held at that temperature for 5 minutes to remove any volatile impurities present. This preheat could be omitted in subsequent applications utilizing the same charge of coating material. With the chamber pressure below one micron, the cadmium sulfide was raised to a temperature of about 800° C. within a time of about one minute and held at that temperature for an additional minute while a portion of the material was vaporized and condensed on the lens. During this time the lens was maintained at a temperature of 350° C. to avoid the presence of free cadmium in the film.

The crucible was then cooled and the lens removed from the chamber. It had a clear, yellow coating of CdS about one micron thick on its surface. When measured on a recording spectrophotometer, a transmission curve corresponding to that of curve A in FIG. 3 was obtained.

This lens was then fusion sealed to an aluminized reflector to produce a yellow color lamp.

*Example 2*

The procedure of Example 1 was followed up to the point where the coated lens was removed from the vacuum chamber with the single exception that the lens was not heated during condensation of the vaporized cadmium sulfide. When the lens was removed, the coating was a dull orange color with a reflective metallic appearance on its surface. It was then heated in an oven to 350° C. whereupon the coating color became a deep orange. Upon cooling it was a clear yellow corresponding to the color of the film of Example 1.

*Example 3*

A glass lens corresponding to that described in Example 1 and cleaned in similar manner was mounted in the thermal evaporation apparatus. About 5 grams of a material commercially available as cadmium selenide was placed in the evaporating crucible. By chemical analysis this material contained 67.8% Cd, 20.6% Se, 11.3% S, this analysis indicating the material to actually be a cadmium sulphoselenide.

The material was baked out at 700° C. as in Example 1, and, with the pressure below one micron, the temperature of the material to be evaporated was raised to 800° C. in about one minute and held at that temperature for a minute while the material volatilized and condensed on the lens.

Upon cooling and removal, the lens had a clear red film about on micron thick on its surface, equivalent to about 0.86 mg. of material per sq. cm. of film. Its spectrophotometric transmission curve corresponded to that shown as curve B in FIG. 3.

*Example 4*

A glass lens was washed and mounted for coating as in Example 3. After baking out the coating material, it was raised to 800° C. and immediately cooled. This produced a very thin light colored film. The lens was then baked in an oven at 500° C. for 10 minutes. While still hot, the lens was remounted in the evaporation apparatus and coated in accordance with the procedure of Example 3. The film produced was indistinguishable colorwise from that of Example 3, but was much more strongly adherent and resistant to peeling or chipping during subsequent processing into a lamp.

It will be appreciated that this invention provides for the first time a means of producing sharp cutoff transmission colors in glass articles without regard to the composition of the glass involved. Thus the invention is applicable to any clear glass article so that the article may be produced from any desired type of glass base such as well known borosilicate, lime or lead silicate glasses. It will also be understood that, while the invention has been illustratively described with respect to a lamp lens, it is equally applicable to other articles as well and that the use of alternative thermal evaporation apparatus and techniques as well as shielding devices for portions of a lamp envelope during coating are contemplated.

What is claimed is:

1. For use in providing a filtered, pure color light from an incandescent lamp, a light filter with a sharp transmission cut-off in the wave length range of 5000–7000 Angstrom units, said filter being a film of pure material selected from a class consisting of CdS, CdSe and mixtures thereof and deposited on a transparent glass base adapted to be assembled in a lamp.

2. An incandescent lamp adapted to provide a filtered, pure color light and comprising an incandescent light source, a transparent envelope and a light filter with a sharp transmission cut-off in the wave length range of 5000–7000 Angstrom units, said filter being a film of a pure material selected from the class consisting of CdS, CdSe and mixtures thereof.

3. An incandescent lamp in accordance with claim 2 which is adapted to provide a yellow light and in which the filter material is CdS.

4. An incandescent lamp in accordance with claim 2 which is adapted to provide a red light and in which the filter is composed of a cadmium sulfoselenide material.

5. An incandescent lamp in accordance with claim 2 in which the light filter film has a thickness on the order of one-half to one micron.

6. A method of producing an incandescent lamp adapted to provide a filtered, pure color light which comprises condensing vapors of a substantially pure material selected from the class consisting of CdS, CdSe and mixtures thereof on the surface of a transparent glass base, continuing such condensation for a sufficent time to form a film of substantially uniform thickness on the order of one-half to one micron, and assembling said filmed glass base with an incandescent light source.

7. A method in accordance with claim 6 in which the condensed vapors are produced by thermal evaporation in an evacuated chamber at a pressure less than one micron and at a temperature not over about 800° C.

8. A method in accordance with claim 6 wherein the filter base is a curved body and is mounted at a distance from the vapor source equal to the radius of curvature of the base whereby a uniform amount of vapor is directed to all parts of the surface being coated.

9. A method in accordance with claim 6 wherein the material is evaporated and condensed on the base in two steps and the base is baked intermediate these steps to improve film adherence.

10. A method in accordance with claim 6 wherein the material being evaporated and condensed is composed in part at least of CdS and the base on which the material is condensed is heated during the coating process.

References Cited in the file of this patent

UNITED STATES PATENTS

| | | |
|---|---|---|
| 2,151,989 | Ewest et al. | Apr. 4, 1939 |
| 2,160,981 | O'Brien | June 6, 1939 |
| 2,290,186 | Holman et al. | July 21, 1942 |
| 2,600,579 | Ruedy et al. | June 17, 1952 |
| 2,675,331 | Cusano et al. | Apr. 13, 1954 |
| 2,688,564 | Forgue | Sept. 7, 1954 |
| 2,710,813 | Forgue | June 14, 1955 |
| 2,732,312 | Young | Jan. 24, 1956 |
| 2,759,119 | Thorington | Aug. 14, 1956 |